Nov. 9, 1948.    L. R. BUCKENDALE    2,453,117
VEHICLE SUSPENSION
Filed Jan. 4, 1944    6 Sheets-Sheet 1

INVENTOR.
LAWRENCE R. BUCKENDALE,
BY
Strauch & Hoffman
ATTORNEYS

Nov. 9, 1948.  L. R. BUCKENDALE  2,453,117
VEHICLE SUSPENSION
Filed Jan. 4, 1944  6 Sheets-Sheet 3

INVENTOR.
LAWRENCE R. BUCKENDALE,
BY
Strauch & Hoffman
ATTORNEYS

Nov. 9, 1948.  L. R. BUCKENDALE  2,453,117
VEHICLE SUSPENSION
Filed Jan. 4, 1944  6 Sheets-Sheet 6

INVENTOR.
LAWRENCE R. BUCKENDALE,
BY
*Strauch & Hoffman*
ATTORNEYS

Patented Nov. 9, 1948

2,453,117

UNITED STATES PATENT OFFICE 2,453,117

VEHICLE SUSPENSION

Lawrence R. Buckendale, Detroit, Mich., assignor to The Timken-Detroit Axle Company, Detroit, Mich., a corporation of Ohio Application January 4, 1944, Serial No. 516,964

18 Claims. (Cl. 267—21)

The present invention relates to vehicle suspensions and is more particularly concerned with suspensions for motor vehicles in which the load of the vehicle is taken by torsionally resilient units.

In my copending application Serial No. 508,020, filed October 28, 1943, for "Vehicle suspensions," I have disclosed suspensions in which pairs of torsionally resilient units are employed to connect the axles to the chassis, the units functioning in either series or parallel to provide cradled suspensions of novel form. The present disclosure deals with further forms of suspensions of the generic invention, and which differ from the suspensions of that application chiefly by utilizing single torsionally resilient assemblies for supporting the load.

It is the major object of this invention to provide novel suspensions in which each axle or axle unit resiliently supports the vehicle through a single torsionally resilient unit, which is connected to the chassis in novel manner, permitting a limited degree of relative lateral self-steering movement of the axle and chassis while having sufficient stability to obviate the need for transverse radius rods or other lateral stabilizing means, and yet which are of simple, low-cost, rugged construction.

A further important object is to provide novel vehicle suspensions embodying a single torsionally resilient assembly which is operable to resiliently support the vehicle upon the axle and also effectively functions to absorb the driving and braking torque reactions set up during operation and to maintain the proper longitudinal spacing of the axle with respect to the chassis.

Another object is to provide vehicle suspensions in which each axle is connected to oppositely rockable elements of a single torsion tube assembly and the latter is so designed that it will completely stabilize the axle irrespective of whether it is of the driving, non-driving, steering or non-steering type.

Another object is to provide a vehicle having a torque tube drive with a torsionally resilient assembly which is built into the torque tube and embodies relatively rockable parts so connected to the vehicle as to constitute the sole load sustaining connection between the vehicle and axle.

Another object is to provide a full length axle assembly with a pair of duplicate torsion assemblies resiliently connecting it to the chassis frame and constituting the sole load sustaining connection between the axle and vehicle and also functioning to completely stabilize the axle with respect to the chassis frame against fore-and-aft translational forces; rotational braking and/or driving torque reactions; and lateral forces set up as the result of side-sway of the vehicle with respect to the axle.

The invention also aims to provide novel suspensions embodying torsionally resilient units in which the levers and links, employed to transmit the load of the vehicle to the axles, are so related that the torsionally resilient elements are subjected to torsional or shearing stresses well within their limitations in response to deflections of the chassis frame, irrespective of whether the elements are of metallic or non-metallic material.

Further objects will become apparent as the specification proceeds in conjunction with the annexed drawings, and from the appended claims.

Figures 1, 1A, 2, 2A, 2B:
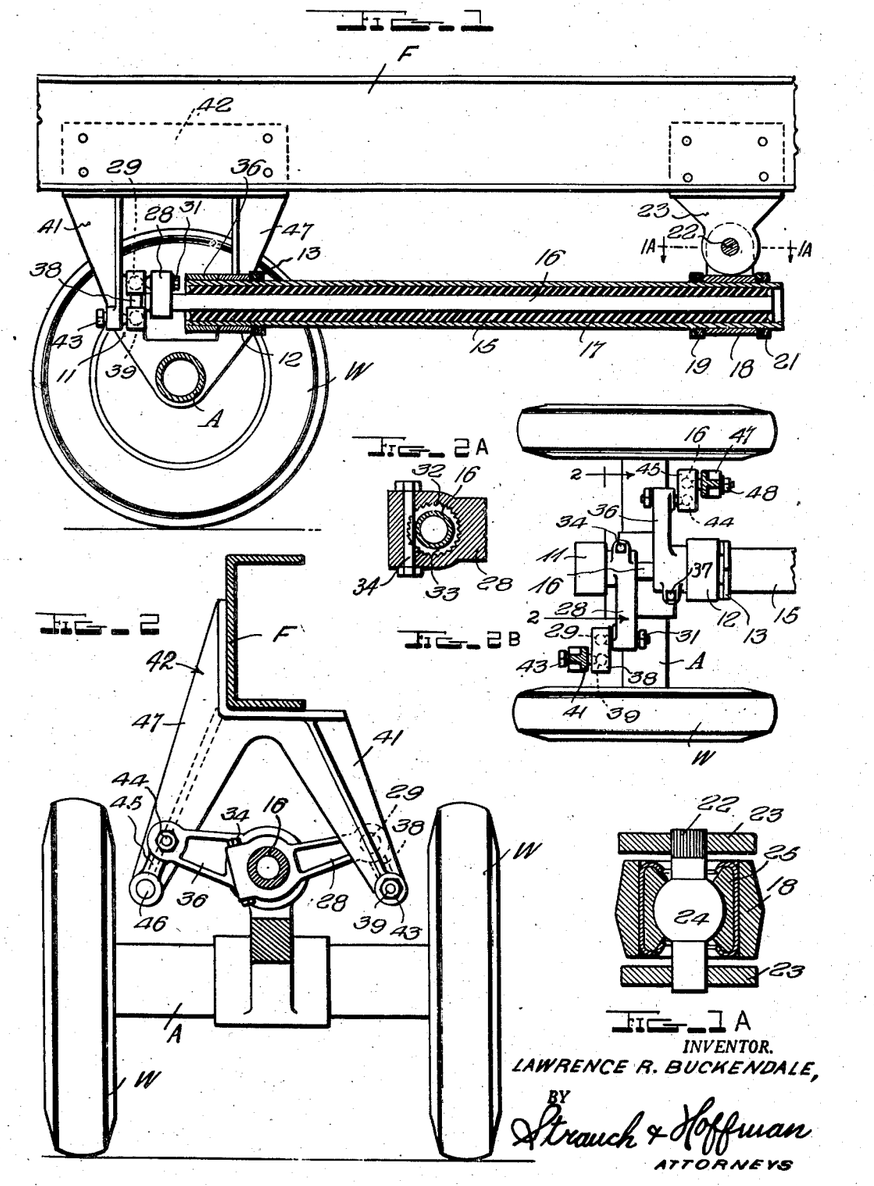
Figure 1 is a vertical longitudinal sectional view through a stub axle suspension of the invention, certain of the parts being broken away to better illustrate certain features.
Figure 1A is a horizontal sectional view through the front end of the torsion tube of Figure 1.
Figure 2 is a partly sectional elevational view of the suspension shown in Figure 1 as it appears when viewed substantially on line 2—2 of Figure 2B.
Figure 2A is a fragmental sectional view showing the manner in which the levers are secured to the torsion tube assembly.
Figure 2B is a top plan view of the suspension of Figure 1.

With continued reference to the drawings, in which like reference characters have been employed to designate similar parts throughout the several views, the suspension shown in Figures 1 and 2 is illustrated as embodied in a so-called stub axle type of vehicle, in which two stub axles are located side-by-side under, and jointly support, one end of a vehicle chassis F, only one stub axle being shown, it being understood that an exactly similar stub axle and suspension is located on the opposite side of the vehicle and secured to the chassis frame. Each stub axle assembly comprises an axle housing A carrying at least one wheel assembly W at each end thereof. As will be hereinafter pointed out, the stub axles may be of the driving or non-driving type as well as of the steering or non-steering type.

In the present instance I have shown a dead or idle axle of the non-steering type for supporting the rear end of a vehicle, as for instance a highway trailer. Axle A is provided with oppositely extending saddles 11 and 12 having concentric longitudinally directed openings. Journalled in saddle 12, and restrained against endwise displacement by means of a pair of lock nuts 13, is a torsion tube assembly embodying an outer tube 15, an inner tube or shaft 16. The term torsion tube assembly, as used in this specification, is employed to designate either assemblies in which a steel or other torsionally resilient rod yieldingly connects the vehicle chassis to the axles or assemblies in which a resilient sleeve working in shear supports the load through a pair of connected sleeves.

Taking up the latter form of assembly shown, a body of rubber or other resilient material 17 is interposed between sleeve 15 and shaft 16, to yieldingly resist relative rocking of the sleeve and shaft. While any suitable material may be used, it is important that it be strongly bonded to both the shaft and sleeve. In the case of rubber, it is vulcanized to each element.

The forward end of sleeve 15 is journalled in a bracket 18 and is restrained against endwise movement by any suitable means such as pairs of lock nuts 19 and 21. Bracket 18 is pivoted for rocking movement about a transverse axis on a pin 22 carried by frame bracket 23.

Pin 22 is rigidly mounted in the legs of bracket 23, and has a central ball portion 24 journalled for rocking movement in a special self-lubricating spherical bushing 25 pressed in bracket 18.

From the foregoing, it is apparent that axle A is restrained against longitudinal movement with respect to the vehicle, so as to absorb braking and driving loads as well as braking and driving torque reactions. Downward movement of the chassis is resiliently resisted by the novel suspension assembly that will now be described.

The rear end of the rod or inner member 16 of the torsion tube assembly is journalled in a suitable bushing carried by saddle 11, and if desired an anti-friction bearing may be employed to reduce friction and wear. This journalling connection further stabilizes the axle against braking and driving torque reactive forces, but it is to be understood that in many instances it will only be necessary to provide the single journalling connection between the outer tube and saddle 12 of the axle, and inner tube 16 permitted to project freely beyond the axle housing.

Secured to rod 16 intermediate saddle 11 and the end of tube 15 is a lever 28 to which a ball swivel member 29, having a tapered shank, is secured by means of a nut 31. Lever 28 may be rigidly secured to shaft 16 in any suitable manner. I have shown in Figure 2A interengaging serrations 32 for locking the parts against relative rocking movement and a bolt 34 passing through a transverse bore in the lever seats in an annular groove 33 in the serrated portion of the shaft, to restrain the lever against endwise displacement. A lever 36 is secured in similar manner by means of a bolt 37 to outer sleeve 15. Lever 36 abuts saddle 12 and restrains sleeve 15 against forward displacement. As seen in Figure 2, the levers extend in opposite directions from the torsion tube assembly and incline slightly upwardly for a reason that will presently appear.

Swivelled on ball 29 is a short link 38 which, as seen in Figure 2, inclines downwardly and outwardly and is swivelled on a ball member 39 secured to a leg 41 of a frame bracket 42 by means of a nut 43.

A similar ball ended swivel member 44 is secured in the free end of lever 36. Swivelled on ball 44 is a short link 45 which is in turn swivelled upon a ball member 46 secured in a leg 47 of bracket 42 by means of a nut 48. It is to be understood that all of the ball and link members are preferably pivotally interconnected by means of self-lubricating bushings of the character shown in Figure 1A, so as to provide a rattleproof assembly which requires no lubrication, and to simplify the disclosure they have been diagrammatically indicated by dotted lines.

As seen in Figure 2, legs 41 and 47 of bracket 42 are disposed on the inside and outside of chassis frame F respectively, and the lever and link assemblies are of equal length, providing a symmetrical suspension. By locating the free ends of levers 28 and 36 above the axis of the torsion tube assembly, and suspending the legs of the chassis brackets upon short links, which incline downwardly and outwardly as shown in Figure 2, a novel suspension is provided in which a given downward deflection of the frame will result in proportionally smaller angular deflection of the levers, with the result that the rubber or other resilient material working in shear is called upon to undergo a deflection well within its shear deflection limit.

The use of comparatively short links provides a construction which manifests a strong tendency to return to the neutral suspended position shown in Figure 2 when the chassis has been shifted to one side or the other in response to road irregularities, and yet the suspension affords a degree of self-steering which is adequate to avoid tire wear in response to lateral movement of the vehicle chassis with respect to the axles or lateral movement of one stub axle assembly with respect to the other, as for instance when rounding turns. As is also apparent, the torsion tube assembly functions as a radius rod to restrain the axle against fore and aft movement with respect to the vehicle frame, and also restrains the axle assembly against rocking about its axis in response to braking or driving torque reactions, it being observed that tube 15 may freely rotate in its journalled connections with saddle 12 and bracket 18 in response to rocking of lever 36 in normal operation. Also, when one wheel passes over a hump in the highway, axle A may tilt, rocking the entire torsion tube assembly about its journalled connection in bracket 18. The torsion tube assembly also may rock bodily about the axis of pin 22 in response to static or impact loading of the chassis. Also, the entire torsion tube assembly may rock from side to side in a horizontal plane, within the limitations imposed by short links 38 and 45 about the axes of their ball joints, it being understood, as previously pointed out, that the links manifest a strong tendency to maintain the suspension in the neutral longitudinal tracking position shown in Figure 2. If desired, suitable stop means for limiting downward movement of the axle may be employed to prevent the axle from tilting downwardly sufficiently to cause the tire to run completely flat in the event of deflation of either tire.

Figures 3, 4, 5:
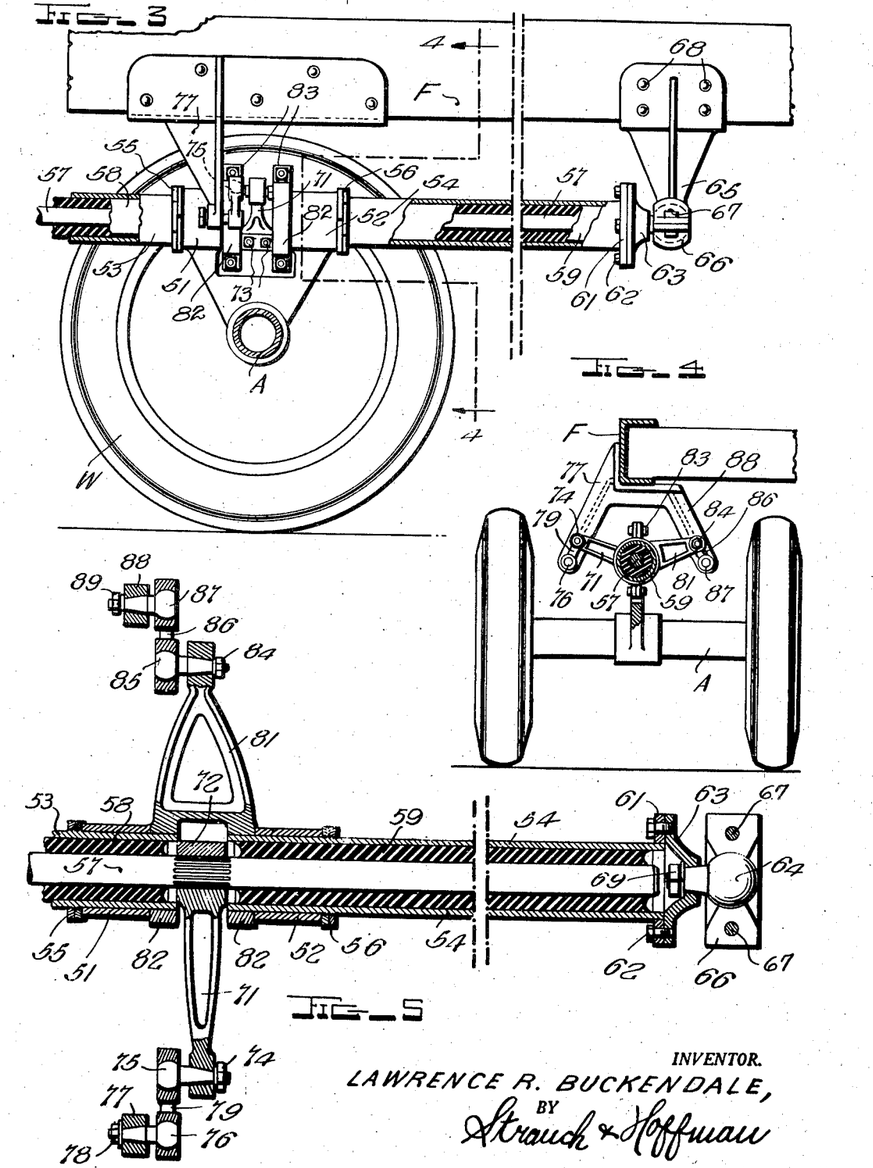
Figure 3 is a view similar to Figure 1, but shows a modified form of suspension of the invention.
Figure 4 is a sectional view taken on the line 4—4 of Figure 3, looking in the direction of the arrows.
Figure 5 is a horizontal sectional view through the torsion tube assembly shown in Figures 3 and 4, the frame mounting brackets being shown somewhat outwardly of their proper position, to more clearly illustrate the structure involved.

In Figures 3, 4 and 5 I have illustrated a modified suspension of the invention which differs primarily from the one just described by utilizing an outer sleeve member which is split into two longitudinally aligned sections.

In this instance axle A is provided with oppositely extending saddles 51 and 52, in which outer torsion tubes or sleeves 53 and 54, respectively, are journalled. They are restrained against endwise movement by pairs of lock nuts 55 and 56. A single tube or rod 57 is disposed within, and secured to, tubes 53 and 54 by means of resilient bushings 58 and 59.

Secured to the front end of tube 54 is a flange 61 as by welding or the like, and secured to the latter by cap screws 62 is a bracket 63 carrying a ball member 64 journalled for free swivelling movement in a frame bracket 65 and a cap member 66, the parts being held in assembled relationship by cap screws 67. Bracket 65 is secured to the frame or any other suitable part of the chassis by means of rivets 68 or the like. Ball member 64 has a tapered shank secured in member 63 by means of a nut 69.

From the foregoing disclosure it is apparent that axle A is pivotally connected to the frame through tube 54 and may undergo limited angular movement in all directions about the axis of ball 64. Sleeve 54 may also undergo limited rocking movement about its axis for a purpose that will presently appear.

The mid-portion of rod 57 is serrated and a lever 71, carrying a correspondingly serrated hub, is rigidly secured thereto. The lever is preferably split, having a cap 72 secured thereto by bolt assemblies 73. Secured in the free end of lever 71, by means of a nut 74, is a ball swivel member 75. Swivelled on ball 75 and on a similar ball member 76 secured in a frame bracket 77 by means of a nut 78 is a short link 79.

The neighboring ends of sleeves 53 and 54 are serrated, and secured thereto are the bifurcations of a forked lever 81, the latter having caps 82 rigidly clamped to the ends of the tubes by means of bolt assemblies 83. Secured in the end of lever 81, by means of a nut 84, is a ball swivel member 85, on which a link 86 is pivoted. The lower end of link 86 is swivelled on a ball member 87 secured in a second frame member 88 by means of a nut 89.

As seen in Figure 4, levers 71 and 81 project in opposite directions from the torsion tube assembly and incline slightly upwardly. Links 79 and 86, as in the previously described form of the invention, incline inwardly and upwardly for the purpose of achieving a minimum deflection of the rubber bushing for a given deflection of the frame. The suspension, by reason of the swivel mounting of the front end of the torsion tube and the novel arrangement of the link and levers, possesses the same desirable self-steering and lateral yieldability characteristics of the form of invention first described, and yet possesses sufficient adequate lateral stability under all conditions of operation.

In both of the forms of the invention previously described, it is to be understood that the suspended height of the vehicle will be determined in the first instance by installing the levers upon the respective torsion tube elements in predetermined angular position, so that when the load of the vehicle is placed upon the suspension the vehicle will descend to a predetermined level with respect to the axles, as determined by the resilience of the rubber or other resilient material interconnecting the torsion tube members. Adjustment of the members may be effected by loosening the lever caps, advancing or retracting the lever one or more serrations and tightening the caps. In this way the proper suspended height of the vehicle may be achieved.

Figures 6, 8:
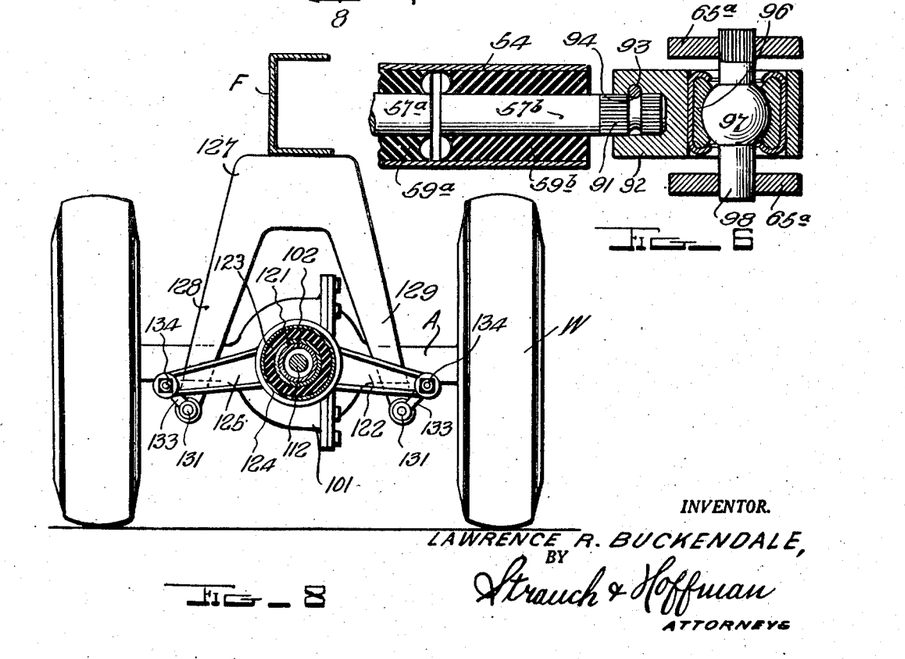
Figure 6 is a fragmental horizontal sectional view showing a modified form of mounting for the front end of the torsion tube of Figures 3, 4 and 5.
Figure 8 is a transverse sectional view of the suspension of Figure 7, taken substantially on line 8—8 of that figure.

In Figure 6 I have illustrated a modified form of mounting for the front end of the torsion tubes, which may be applied to either of the forms of suspensions previously described.

I have illustrated the torsion tube mounting of Figure 6 as being applied to the suspension of Figures 3, 4 and 5, in which the forward end of the torsion rod is split into two aligned sections 57a and 57b, which are rigidly secured to tube 54 by resilient bushings 59a and 59b, respectively.

The front end of shaft 57b is provided with serrations 91 tightly fitting serrations in a bracket 92, endwise displacement of the parts being prevented by a bolt 93 seating in an annular groove 94 in the splined section of the shaft. Pressed in a cross bore in bracket 92 is a self-lubricating spherical bearing bushing 96 coacting with a spherical bushing 97 pressed on a pin 98. The latter is rigidly mounted in a frame bracket of modified form having downwardly extending legs 65a.

This suspension functions in the same manner as those previously described, except that bushing 59b allows relative rocking movement of torsion tube 54 about its axis in response to operation of the lever assemblies, and additionally serves to resiliently absorb fore-and-aft shocks imparted from the axle to the torsion tube device, inasmuch as rubber bushing 59b permits limited relative endwise movement of sleeve 54 and shaft 57b.

Figure 7:
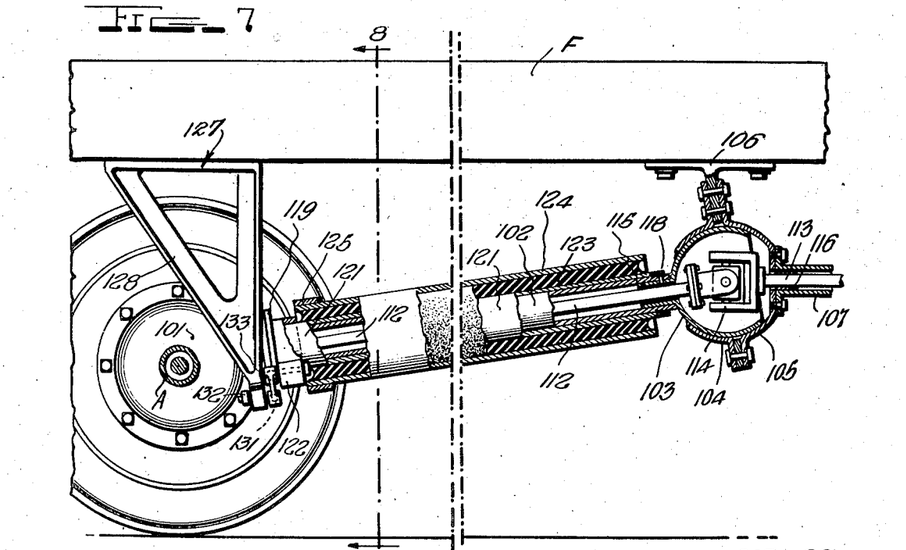
Figure 7 is a longitudinal sectional view through a stub drive axle embodying a suspension of the invention.

In Figures 7 and 8 there is disclosed a drive axle embodying a suspension of the invention, in which the torsion tube assembly surrounds the torque tube assembly.

In this instance axle A is provided with a central bowl portion 101 embodying a bevel gear or any other conventional single or multiple gear reduction (not shown). Bolted to a forwardly facing flange on the axle bowl is a torque tube 102, having a spherical front flange 103 mating with spherical socket members 104 and 105, the latter being bolted to a bracket 106 secured to the chassis frame. Members 104 and 105 cooperate to form a generally spherical housing, and member 105 is secured to a housing 107 which extends forwardly to the vehicle transmission or other prime mover (not shown).

Pinion driving shaft 112 extends forwardly through torque tube 102 and is connected to a propeller shaft 113 by means of a universal joint 114. The neighboring ends of shafts 112 and 113 may be journalled in the torque tube and housing 107 by bushings 115 and 116, respectively, or in any other well-known manner.

The structure so far described constitutes a conventional torque tube drive which restrains the axle against longitudinal displacement with respect to the vehicle chassis, while permitting a limited universal swivelling action about the axis of housing sections 104 and 105. I have found that by incorporating a torsion device directly in the torsion tube, and connecting the torsion tube elements to the chassis adjacent the axle, in the novel manner now to be described, an efficiently performing suspension of simple, rugged design is achieved, and which possesses highly desirable operating features lacking in the torque tube drives heretofore proposed.

Freely journalled on torque tube 102, and restrained against endwise movement thereon by means of a pair of lock nuts 118 at the forward end and a flange 119 provided at the rear end of sleeve 102 is a sleeve 121 having a lever 122 rigidly secured thereto. Telescoped over, and resiliently secured thereto by means of a sleeve 123 of rubber or other suitable resilient material, is an outer sleeve 124 rigidly carrying a lever 125.

As seen in Figure 8, levers 122 and 125 extend outwardly in opposite directions from the torsion tube assembly and incline slightly downwardly. Rigidly secured to the frame in any desired manner is a bracket 127 having downwardly extending legs 128 and 129 disposed on opposite sides of the torsion tube assembly. Secured in the lower end of each leg is a ball member 131 having a tapered shank seating in a boss in the bracket and secured in place by a nut 132. Swivelled on each member 131 is a short link 133. The links incline upwardly and outwardly and are swivelled on ball-ended swivel members 134 carried by the free ends of levers 122 and 125.

From the foregoing, it is apparent that the downward static or impact load of the vehicle is transmitted through bracket legs 128 and 129; links 133; and levers 122 and 125 to sleeves 121 and 124, tending to rotate them in opposite directions. Resilient sleeve 123, being securely bonded to the inner and outer sleeves, operates in shear to yieldingly restrain the sleeves against relative rocking movement, thereby resiliently suspending the chassis on the axle. Yet by reason of the swivel joint at the forward end of the torque tube, and the short upwardly and outwardly inclined links 133, the two axles of the suspension may undergo limited transverse movement with respect to each other and to the chassis, affording a desirable degree of self-steering sufficient to avoid tire wear. Also, because links 133 are comparatively short, they manifest a strong tendency to return the chassis to the neutral loaded position shown in Figure 8, preventing any undesired side sway of the vehicle and in most instances eliminating the need for any transverse radius rods or other stabilizing means.

It is to be particularly observed in Figure 8 that levers 122 and 125 incline downwardly and that links 133 incline upwardly and outwardly. This relationship is reverse of that illustrated in Figures 2 and 4, in which the levers incline upwardly and the links incline inwardly and upwardly. I have discovered that by inclining the levers downwardly as illustrated in Figure 8, and inclining the links upwardly and outwardly, that the highly desirable feature of achieving a minimum angular deflection of the inner and outer torsion tubes for a given frame deflection, present in the devices of Figures 2 and 4, is also achieved in the device of Figure 8.

Figure 9:
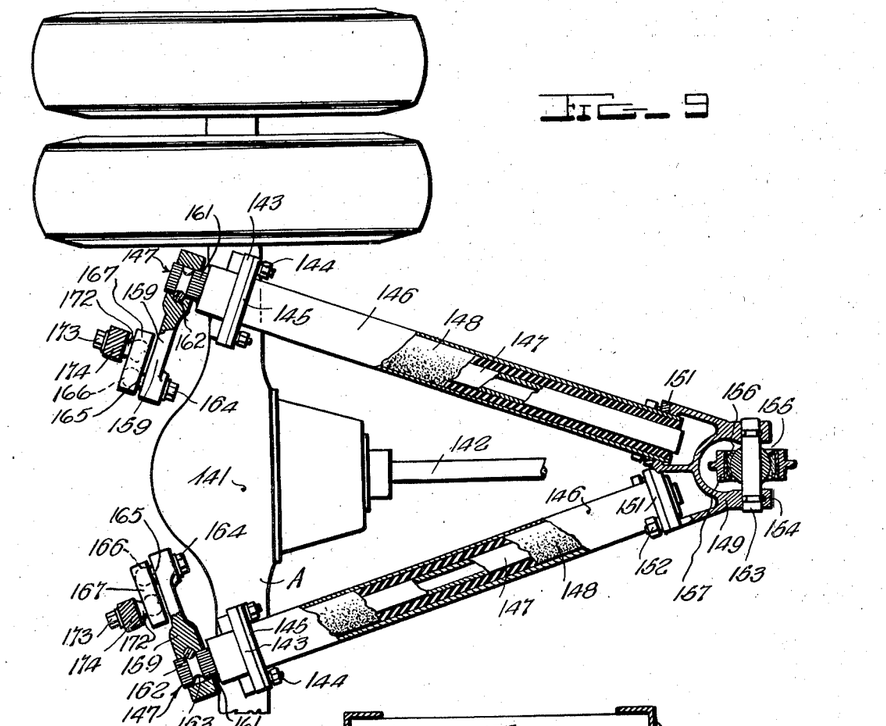
Figure 9 is a top plan view of a full length drive axle suspension forming part of the invention, parts being shown in section to clarify the disclosure.
Figure 10:
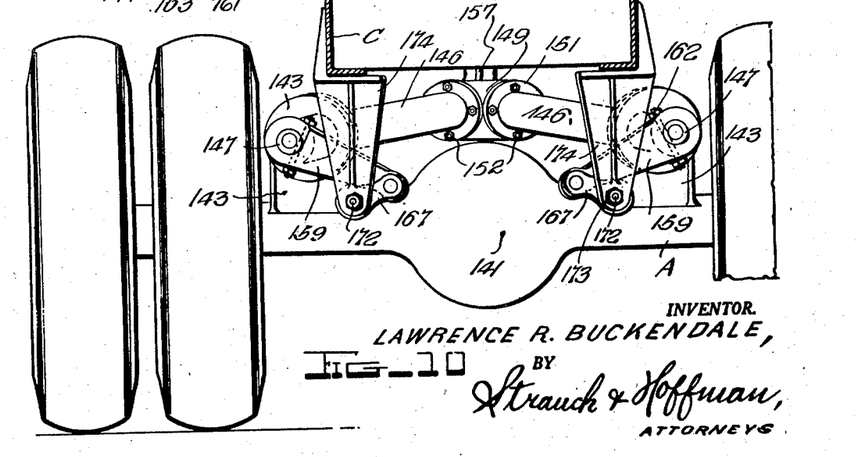
Figure 10 is a fragmental end elevational view of the suspension illustrated in Figure 9.

The novel suspension of the invention may also be applied to full length axles of either the driving or the non-driving type, and in Figures 9 and 10 I have illustrated a suspension of the invention embodied in a full length drive axle.

In this form of the invention axle A is provided with a central bowl portion 141 containing any desirable form of rear axle drive, power being transmitted thereto in conventional manner by way of a drive shaft 142. Secured to each axle arm, by welding or the like, are apertured brackets 143. Secured to each bracket, by bolt and nut assemblies 144, is a flange 145 of a torsion tube 146, which extends rearwardly through the bracket. Disposed in tube 146 is an inner torsion rod or tube 147 and is resiliently connected thereto by a sleeve 148 of rubber or other flexible material, the latter being firmly bonded to each. Tubes 146 extend into openings in a front bracket 149 and have welded flanges 151 rigidly secured to bolting faces on the bracket by stud and nut assemblies 152.

The forward end of bracket 149 is forked and carries a pin 153 secured in place by cap screws 154. Pressed on pin 153 is a spherically faced bushing 155, which is journalled in a self-lubricating bushing 156 pressed in a cross-bore in a frame bracket 157, which is secured to the chassis frame in any suitable manner.

From the foregoing it is apparent that the outer torsion tubes are rigidly connected to the axle at their rear ends and to each other at their forward ends, and the axle and tube assembly may bodily rock about the axis of bushing 155, but the axle is restrained against longitudinal movement with respect to the frame. I have found that, by connecting the inner torsion tube to the chassis in the novel manner now to be described, it is possible to resiliently support the vehicle upon the chassis by a simple frame bracket and achieve a stabilized suspension, eliminating the need for radius rods or other stabilizing means.

As seen in Figure 9, inner tubes 147 extend rearwardly beyond outer tube 146 and carry levers 159 at their free ends, the latter extending substantially at right angles to the tubes rearwardly of the axle bowl, as seen in Figure 9. The levers may be secured to the tubes in any desired manner, as for instance by means of serrations 161, and a bolt and nut assembly 162 passing through an opening in the lever engages a groove 163 cut into the serrations, to restrain the levers against endwise movement. Secured by a nut 164 in the free end of each lever 159 is the tapered shank of a swivel member 165 which has a ball end 166 swivelled in a link 167. As seen in Figure 10, links 167 incline outwardly and downwardly and are swivelled on the ball ends of swivel members 172 having tapered shanks secured by means of nuts 173 in a frame bracket 174.

It is therefore apparent that the static and impact load of the vehicle is transmitted by brackets 174, links 167 and levers 159 to the inner torsion tubes, thereby resiliently supporting the vehicle upon the axle, and by reason of the inclination of the links and levers, the suspension possesses adequate lateral stability without resort to radius rods or other equivalent stabilizing means, and at the same time the suspension provides sufficient transverse movement of the axle and frame to cushion transversely directed shocks. Also, because of the inclination of the links, the resilient sleeves are subjected to a minimum angular distortion or shearing stress in response to a given deflection of the chassis frame. The suspension accordingly possesses all of the desirable features of the one disclosed in Figures 7 and 8, and provides a so-called Hotchkiss drive, as distinguished from the torque tube drive of that form of the invention.

Figure 11:
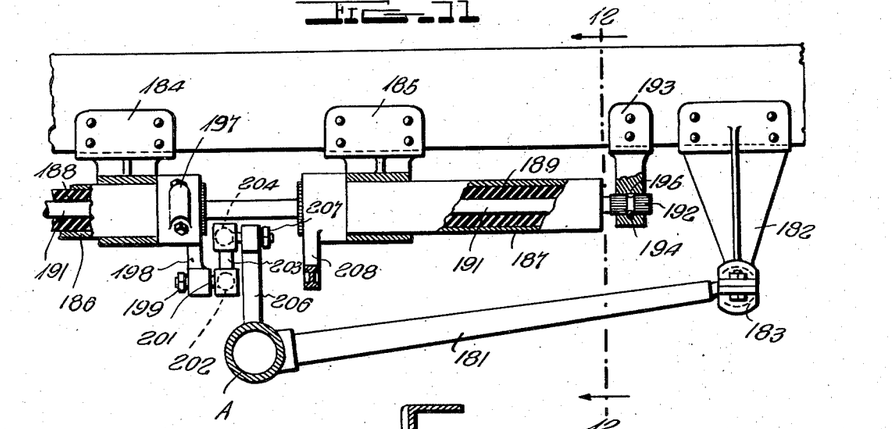
Figure 11 is a longitudinal sectional view through a stub axle assembly embodying a further form of suspension of the invention.
Figures 12, 13, 16:
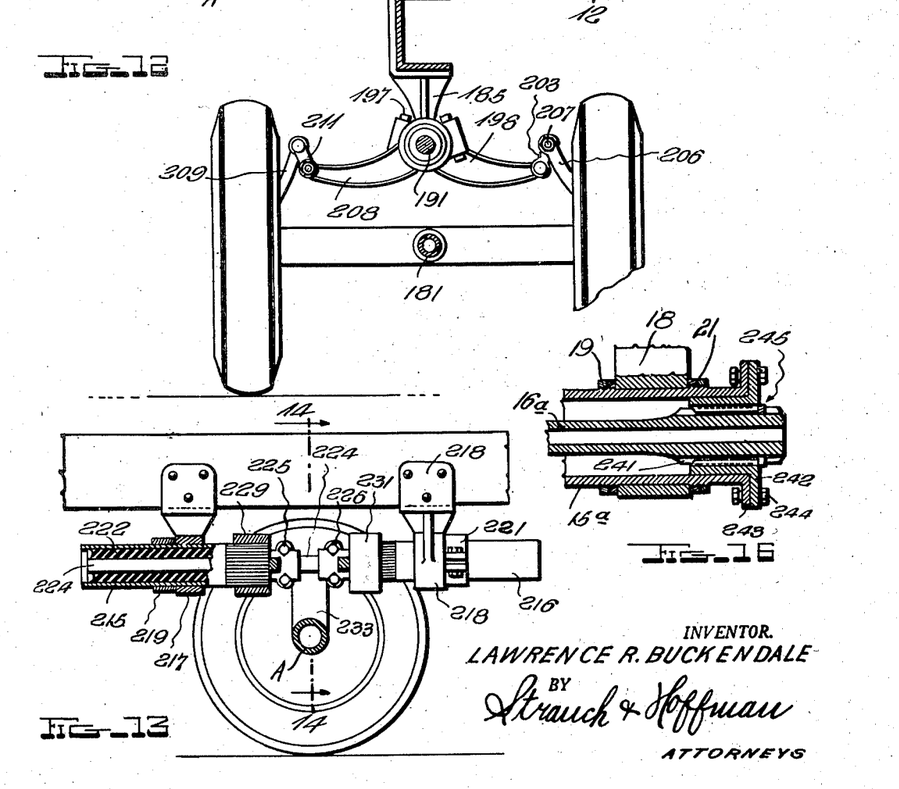
Figure 12 is a vertical transverse sectional view of the suspension of Figure 11, taken on line 12—12 of that figure.
Figure 13 is a longitudinal sectional view of a stub axle embodying a further modified form of suspension of the invention.
Figure 16 is a fragmental longitudinal sectional view of the suspension of Figure 1 as embodying a modified torsion rod assembly of the invention.

In Figures 11 and 12 I have disclosed an axle of the trailing or non-driving type, but which may be of the driving type, supported on a torsion tube assembly carried by the frame and stabilized by means of a radius rod.

Referring to Figures 11 and 12, axle A rigidly carries a radius rod 181, which is pivotally secured to a bracket 182 on the frame by means of a spherical ball and socket connection 183. If desired, however, a spherical bushing assembly of the character shown in Figure 9 may be employed. Journalled in a pair of longitudinally spaced frame brackets 184 and 185 are a pair of aligned outer torsion tubes 186 and 187.

Telescoped within tubes 186 and 187 and resiliently connected thereto by rubber or other resilient bushings 188 and 189 is an inner torsion tube rod 191 having a splined forward end 192 secured in a correspondingly splined frame bracket 193. Rod 191 is restrained against endwise movement by means of a cap screw 194 seating in a groove 195 in the rod and threaded into the bracket. Rod 191 is accordingly anchored against rocking or endwise movement, and outer sleeves 186 and 187 are rockably mounted in the frame. The latter resiliently support the chassis upon the axle by the novel lever and link assemblies now to be described.

Splined on the end of sleeve 186, and restrained against endwise displacement by means of a bolt and nut assembly 197, is a lever 198 which, as seen in Figure 12, inclines downwardly and outwardly. Secured in the free end of lever 198, by means of a nut 199 threaded on the tapered shank thereof, is a swivel member 201 having a spherical end 202. Swivelled on member 202 is a comparatively short link 203 which is swivelled at its upper end on the ball end 204 of a swivel member having a tapered shank secured in a perch 206 formed on the axle housing, by means of a nut 207.

A similar lever 208 is rigidly carried by the end of tube 187 and is pivotally connected to a second perch 209 on the axle by means of a link 211, ball-ended swivel members of the character just described being employed to connect the links to lever 208 and perch 209.

As seen in Figure 12, levers 198 and 208 extend in opposite directions from the torsion tube assembly and incline downwardly and outwardly; links 203 and 211 incline upwardly and outwardly. Accordingly, it is apparent that, although the torsion tube assemblies are carried by the frame in this form of the invention, the lever and link organization provides adequate lateral stabilization and yet affords a desirable degree of cushioned relative lateral displacement of the axle and chassis, and by reason of the lever and link inclination, the rubber bushings are subjected to a minimum shearing stress for a given deflection of the frame.

Figure 14:
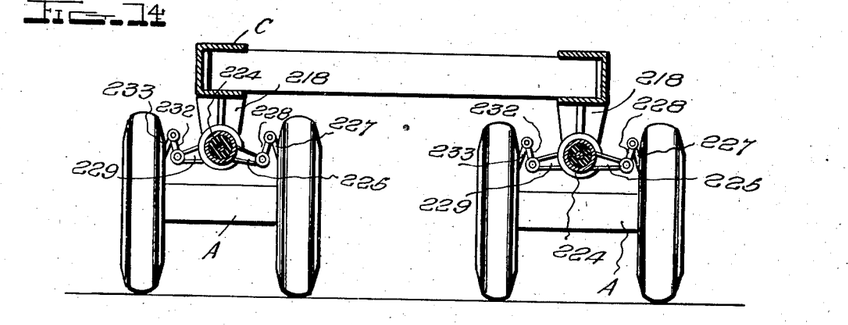
Figure 14 is a vertical sectional view taken substantially on the line 14—14 of Figure 13.
Figure 15:
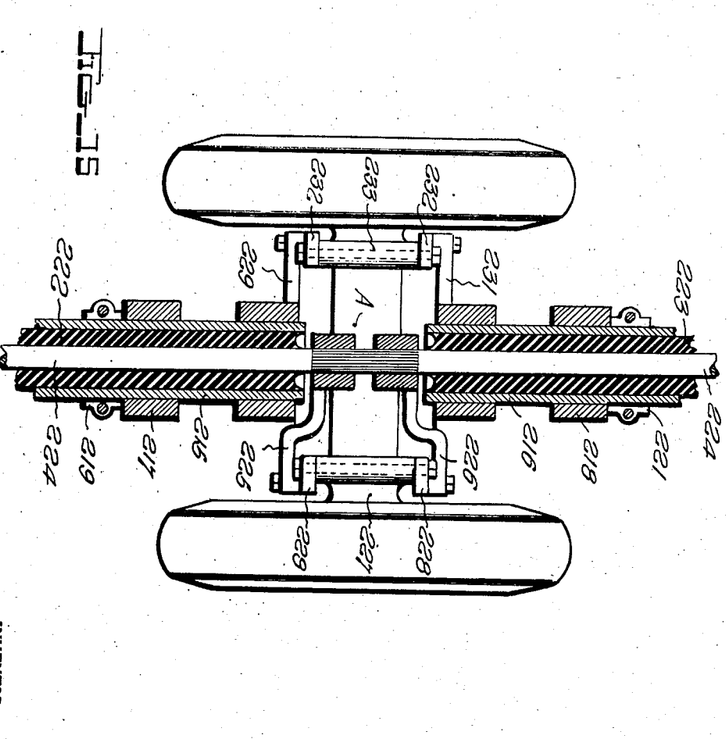
Figure 15 is a top plan view of one of the suspensions of Figure 14, the torsion tube assembly being shown in section to clarify the disclosure.

In Figures 13, 14 and 15 I have illustrated a further modification of the invention in which the torsion tube assemblies are carried by the vehicle frame and the parts are so designed that the links and levers interconnecting the axle and frame completely stabilize the suspension.

With continued reference to these figures, outer torsion tubes 215 and 216 are journalled in brackets 217 and 218 secured to the frame, and are restrained against endwise movement by clamp collars 219 and 221 respectively. Secured within sleeves 215 and 216, by means of rubber bushings 222 and 223, is an inner tube or rod 224, having a splined portion extending between the neighboring ends of the outer tubes. Secured to the splined portion of shaft 224 are a pair of levers 225 and 226 which, as seen in Figure 14, are secured to a perch 227 on the axle housing by means of a pair of links 228. The levers preferably incline downwardly and outwardly, and the links incline upwardly and outwardly from the free ends of the levers, in order to achieve a suspension in which the rubber sleeves will undergo a minimum distortion for a given deflection of the frame.

A pair of levers 229 and 231 are secured to the neighboring ends of tubes 215 and 216 respectively, and are connected by a pair of links 232 to a perch 233 provided on the axle housing, it being observed that the levers have an effective length equal to levers 225 and 226 and incline outwardly and downwardly.

By employing longitudinally spaced pairs of levers and links, and non-swivelling or uniplanar pivoted connections between the links and levers, the torsion tube devices in this form of the invention function to completely stabilize the axle with respect to the vehicle chassis, restraining it against endwise movement as well as against rocking movement about its axis in response to drive and braking torque reactions. From the foregoing it is apparent that the load of the vehicle acting downwardly upon the inner and outer torsion tubes tends to rotate the outer tube in one direction and the inner tube or rod in the opposite direction against the yielding resistance of resilient bushings 222 and 223. The levers and links function in the same manner as the previously described forms of the invention to transmit the load of the vehicle to axles, and at the same time provide a desirable degree of lateral cushioning with sufficient lateral stability to avoid the necessity of employing radius rods or suitable assemblies.

The foregoing suspensions of the invention have been illustrated as embodying torsion assemblies made up of inner and outer relatively rockable members interconnected by a sleeve of resilient material, but it is to be understood that the invention is also applicable to suspensions embodying torsion assemblies made up of a solid or hollow steel or other torsionally flexible member so anchored as to resiliently support the vehicle; and in Figure 16 the suspension of Figures 1 to 3, inclusive, is illustrated as embodying a torsion assembly of that character.

In this figure similar reference characters with the subscript "a" have been employed to designate parts which are similar to and perform similar functions to corresponding elements of the suspension of Figure 1. The rear end of rod 16a is journalled in saddle 11 and sleeve 15a is journalled in saddle 12 as in Figure 1 and the front end only of the assembly has been shown in order to simplify the disclosure. The front end of rod 16a, which is torsionally resilient and may be either solid or hollow, is anchored directly to tube 15a, so that as the tube and rod rock relatively in response to loading of the vehicle the rod will undergo torsional deflection and resiliently support the vehicle. The front end of rod 15a may be anchored to the tube in any desired manner, as for instance by providing it with splines 241. The latter mesh with internal splines in a flanged collar 242 secured to a flange 243 on tube 15a by means of nut and bolt assemblies 244. Rearward endwise displacement of rod 16a is prevented by a split ring 245 seating in a recess cut in splines 241.

This suspension functions in the same manner as those previously described. The vehicle applies downward forces to the ends of levers 28 and 36 through links 38 and 45 tending to rock rod 16a and tube 15a in opposite directions. This action is resiliently resisted by rod 16a, which undergoes a torsional deflection proportional to the load imposed upon the system. The other suspensions shown may be modified in a similar manner to incorporate a torsionally resilient rod rather than the resilient rubber sleeves illustrated as being associated therewith, and the appended claims are intended to embrace the novel suspensions of the invention irrespective of the specific character of the torsion units.

From the foregoing detailed disclosure it is apparent that the invention provides novel vehicle suspensions embodying single torsion units in which the relatively rockable elements are so connected to either the chassis or axle that cradled suspensions are provided which afford a degree of transverse movement of the chassis with respect to the axle sufficient to provide self-steering of the axles and yet the suspensions possess sufficient lateral stability to make it unnecessary to employ transverse radius rods or other stabilizing means; the torsion units of a number of the suspensions perform the additional function of absorbing braking and driving torque reactions, thereby eliminating the need for torque or radius rods, and the suspensions all embody novel lever and link assemblies which function to subject the torsion units to angular deflections which are of proportionately smaller magnitude than the deflection of the chassis, and yet the suspensions are of simple, low cost and rugged construction.

It is to be understood that, while I have shown the novel suspensions of the invention as being embodied in non-steering axles, they may be readily incorporated in steering drive axles without departing from the spirit of the invention. For instance the axles illustrated may be converted to steer axles by bolting dirigible wheel and spindle assemblies on the ends of the axle housings, and the appended claims are intended to embrace the invention when it assumes those forms.

The geometry of the lever and link assemblies, which causes comparatively great deflections of the chassis to be reflected as smaller angular deflections of the torsion assemblies, and which insures minimum torsional deflection of the torsion assemblies, irrespective of whether the levers incline upwardly or downwardly with respect to the torsion assemblies, is apparent from the relationship of the lever ends to the inclined links. However, a graphic explanation is fully disclosed in my aforementioned copending application, to which reference may be had for a more detailed disclosure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle suspension, a vehicle chassis, an axle assembly beneath said chassis comprising a transverse axle structure carrying at least one wheel at each end thereof; a torsion suspension device extending substantially longitudinally of said chassis; said suspension device comprising a rod member and an enclosing sleeve member resiliently connected together by a sleeve of resilient material; means for connecting one end of said suspension device to said chassis for limited rocking movement about vertical and horizontal axes; means for connecting the other end of said suspension device to said axle structure in such manner as to restrain the latter against longitudinal translational movements with respect thereto; lever means on said members adjacent said axle structure; and link means connecting said lever means to said chassis in such manner that said members tend to rock in opposite directions in response to the load imposed thereupon by said chassis.

2. In a vehicle having a chassis, an axle assembly beneath said chassis comprising a transversely disposed axle structure carrying at least one wheel at each end thereof; a longitudinally extending torsion spring assembly, means securing one end of said spring assembly to said chassis for free swiveling action on a fixed pivot, means connecting said spring assembly in longitudinally spaced relation from its pivoted end to said axle structure between the wheels, said spring assembly comprising a pair of lever arms angularly movable relatively to each other and extending in opposite directions toward the wheels and means resiliently interconnecting said lever arms, a support carried by said chassis projecting downwardly therefrom between the wheels, and means for pivotally connecting said support to each of said lever arms in chassis suspending relationship therewith.

3. In a vehicle suspension, a vehicle chassis structure, an axle assembly disposed beneath said chassis structure and comprising a transverse axle structure carrying at least one wheel at each end thereof; a longitudinally extending torsion device carried by one of said structures, said device comprising a rod and a pair of concentric sleeves disposed in end-to-end relationship and surrounding the rod and secured thereto by an interposed body of resilient material; a lever secured to each of said sleeves; a lever secured to said rod adjacent the axle, the lever of said rod projecting laterally from one side of said torsion device and the levers of said sleeves projecting laterally from the opposite side; and means connecting the free ends of said levers to the other of said structures in load sustaining relationship thereto.

4. The vehicle suspension defined in claim 3, wherein said torsion device is carried by said chassis structure and a link pivotally connects each lever to said axle structure.

5. The vehicle suspension defined in claim 3, wherein said torsion device is carried by said chassis structure and said means connects said levers to said axle structure and comprises perch means on said axle structure intermediate said wheels and a link extending from said perch means to the free ends of each of said levers and secured thereto by pivot means, said pivot means confining said links to swinging movement in predetermined planes with respect to said levers and to said perch means, for precluding both longitudinal translational movement of said axle structure with respect to said chassis and rocking movement of said axle structure about its axis.

6. In a vehicle having a chassis structure supported by a wheeled axle structure, means for resiliently connecting said axle structure to said chassis structure, comprising a torsion device, said device comprising an inner member and an outer member telescoped over the inner member and operably connected so as to yieldingly resist relative rocking movement, said members each having a lever rigidly carried thereby and terminating in a free end normally spaced materially from the level of its member; means for journalling one member of said torsion device on one of said structures; a link pivotally connected to the free end of each of said levers; means for pivotally securing said links to the other of said structures, said links being so inclined with respect to the vertical, and said levers being so inclined with respect to the horizontal that downward deflection of said chassis assembly results in a relatively small angular deflection of said levers.

7. The vehicle suspension defined in claim 6, wherein said levers incline outwardly and upwardly from their respective members, and said links incline upwardly and inwardly toward a vertical plane containing the axes of said members, whereby progressive downward deflection of said chassis results in angularly deflecting said levers through progressively smaller increments.

8. In a torsion spring suspension interposed between a vehicle frame structure and an axle structure supported by road engaging wheels, a longitudinally disposed torsion spring assembly comprising resiliently interconnected concentric members, motion transmitting mechanism individual to each of said concentric members and connecting said members to laterally spaced points on one of said structures to relatively rotate said members and stress said spring assembly, and means mounting said spring assembly at longitudinally spaced points on the respective structures, to maintain said assembly effectively resistant to axle torque forces.

9. In a torsion spring suspension interposed between a vehicle frame structure and an axle structure supported by ground engaging wheels, a longitudinally disposed torsion spring assembly comprising yieldably interconnected inner and outer members, means journaling the outer of said members on one of said structures to permit free rocking of said spring assembly during operation, and force transmitting means individually connecting said members to laterally spaced points on said other structure operative to relatively actuate said members and stress the spring assembly.

10. In the suspension defined in claim 9, said force transmitting means comprising generally oppositely extending levers rigid with said members and links pivoted to said levers and extending downwardly and outwardly to pivot points on said other structure.

11. In the suspension defined in claim 9, said force transmitting means comprising generally oppositely extending levers and links pivoted to said levers and extending upwardly and outwardly to pivot points on said other structure.

12. In a torsion spring suspension interposed between an axle structure and a vehicle frame structure, a longitudinally rigid torsion spring assembly comprising yieldably interconnected inner and outer members, means freely journaling the outer of said members on said axle structure for supporting said spring assembly thereon, means retaining said assembly against longitudinal displacement relative to said axle structure, means individual to each member connecting said members to laterally spaced points on the vehicle frame structure and comprising pivotally articulated elements operative under load to relatively rotate said members and stress the spring assembly, and means pivotally connecting said spring assembly to said frame structure remote from said axle structure.

13. In the suspension defined in claim 12, said spring assembly being journaled at one end on said axle structure and pivotally connected at the other end to said frame structure.

14. In combination with a vehicle chassis and axle, suspension mechanism connected between said vehicle parts and comprising a longitudinally disposed torsion unit embodying relatively rotatable members and a torsionally resilient element directly connecting said members, means ineffective to torsionally stress said unit mounting said unit on one of the vehicle parts for vertical and transverse movement relative to said part, means securing said unit on the other vehicle part, and additional means connected to one of the vehicle parts and operatively connected to said unit to relatively rotate said members and torsionally stress said resilient element in relative movement of said vehicle parts.

15. The combination defined in claim 14, in which said additional means includes a load sustaining lever connected with said unit adjacent said other vehicle part and operable in a vertical plane transversely of the vehicle chassis.

16. The combination defined in claim 14, in which said torsion unit is mounted on the vehicle chassis at one of its ends for angular movement and is secured at its other end on the axle, and said additional means is operatively connected to said unit at the latter end thereof.

17. The combination defined in claim 14, in which said additional means comprises an articulated lever and link system substantially entirely located between the vehicle chassis and axle.

18. In a vehicle having a chassis supported by a wheeled axle, means for resiliently connecting said chassis and said axle comprising an inner member and an outer member telescoped over the inner member and connected thereto by a body of resilient material working in shear to yieldingly resist relative rocking movement of said members, one member being pivoted for rocking movement on said chassis and the other member having a lever rigidly carried thereby and terminating in a free end transversely spaced from the axis of said other member, means for securing said axle to said one member in longitudinally spaced relation to the pivotal connection between said one member and said chassis, a link pivotally connected to the free end of said lever, means for pivotally securing said link to said chassis, said link being so inclined with respect to the vertical and said last named means being so located with respect to the axis of said members that relative deflection of said chassis and said axle results in a relatively small angular movement of said lever.

LAWRENCE R. BUCKENDALE.

REFERENCES CITED

The following references are of record in the file of this patent:

UNITED STATES PATENTS

| Number | Name | Date |
| --- | --- | --- |
| 1,554,102 | Kysor | Sept. 15, 1925 |
| 1,964,735 | Knox et al. | July 3, 1934 |
| 2,051,864 | Knox et al. | Aug. 25, 1936 |
| 2,080,969 | Macbeth | May 18, 1937 |
| 2,149,297 | Knox | Mar. 7, 1939 |
| 2,162,198 | Herrington | June 13, 1939 |
| 2,226,047 | Borgward | Dec. 24, 1940 |
| 2,226,406 | Krotz | Dec. 24, 1940 |
| 2,242,030 | Hicks | May 13, 1941 |
| 2,251,698 | Willson | Aug. 5, 1941 |
| 2,264,023 | Faber | Nov. 25, 1941 |
| 2,330,482 | Fageol | Sept. 28, 1943 |
| 2,333,008 | Holmstrom et al. | Oct. 26, 1943 |
| 2,345,201 | Krotz | Mar. 28, 1944 |